Figure 1:
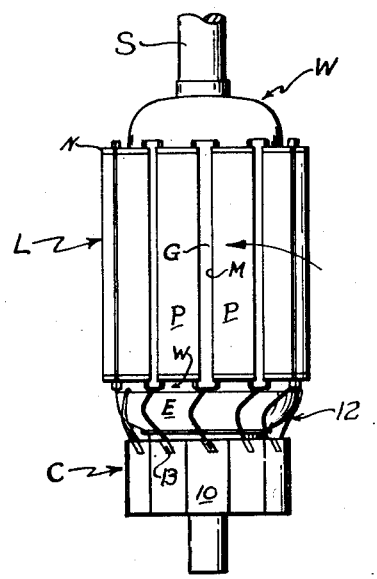

April 23, 1957 — R. L. CLAGETT — 2,790,101
ARMATURE STRUCTURE
Filed March 29, 1955.

INVENTOR.
ROYAL L. CLAGETT
BY
Golrick & Golrick
ATTORNEYS

United States Patent Office 2,790,101
Patented Apr. 23, 1957

2,790,101

ARMATURE STRUCTURE

Royal L. Clagett, Carroll County, Md., assignor to The Black & Decker Manufacturing Company, Towson, Md., a corporation of Maryland Application March 29, 1955, Serial No. 497,533

3 Claims. (Cl. 310—234)

The present invention relates to an improvement in armature construction, more particularly to structure for connection of the commutator and armature coil winding.

In the long period since commutator type motors have come into use much attention and effort has been devoted to improvements in the mechanical and electrical characteristics of those elements comprising the structure for effecting commutation, such as brushes, brush holders, brush lead connections, commutator bars and insulation, overall commutator structure and armature coil lead connections, and in the methods of manufacturing the same. However, even today a common source of failure of otherwise excellent armatures still lies in breakage of the coil leads at the individal commutator bars or segments. This type of failure occurs especially where a motor is used in a service imposing a pulsating load, or an abruptly and frequently changing load, which it has been found causes frequent repeated momentary rotational displacement, that is, a torsional vibration of the armature core iron, and therewith the windings, relative to the commutator. As the conventional coil leads enter the commutator bars generally peripendicularly to the inner end face of the bar, a shearing stress is applied perpendicular to the lead axis at a point adjacent the bar surface, the frequent repetition of which results in the noted failure.

Despite the fact that failure of this character in commutator motors was recognized as a problem many decades ago and that attempts were made to obviate or at least minimize it by reinforcing the portion of each lead where it entered or was connected to its corresponding commutator bar, by providing a quite resilient connection through a helical conducting element between lead and bar, by using a lead with what was expected to be a stress absorbing loop or bight, or other such means; no simple, acceptable and effective means was found for minimizing the lead breakage, much less such means as would be adapted to use in low cost mass production of armatures for fractional horsepower motors.

It is common practice in the manufacture of fractional horsepower motors to bring a coil lead into a slot cut into the arcuate face of the corresponding commutator bar or segment at the inner end of the bar, the lead being held in the slot either by solder applied through a dip soldering operation after all leads are placed or by staking the edges of the commutator slot in upon the lead. The segment slot has hitherto been cut parallel to the armature axis with the lead therefore entering the inner end of the bar perpendicularly, although at times there might be a bight or loop in the remainder of the lead before entering the windings proper. According to the present invention such structure is modified by disposing the bar slot obliquely to the center line of the bar, that is skew rather than parallel to the armature axis, preferably with the open end of the slot displaced toward the direction of armature rotation; and the lead is run out of the bar in the direction of the slot to a point where a smooth bend is formed carrying the lead in a reverse direction back to the corresponding portion of the windings. By such curved disposition of the lead and skew direction of the slot the above mentioned type of failure is greatly decreased, because that portion of the lead where failture was usually occurred is stressed primarily in tension or compression with the shearing force component being of relatively small value under the conditions of torsional displacement of elements discussed above.

Figure 2:
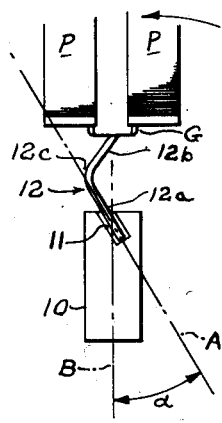

The general object of the present invention is the provision of an armature construction wherein the form of the commutator segments and corresponding armature coil leads for commutator and winding connections are such as will decrease the frequency of lead breakage at the commutator. Another object of the invention is the provision of a simple structure for connection of leads to commutator requiring a minimum of change from standard armature construction and dimension in a given motor. A still further object is to provide a connection of an armature coil lead to a commutator adapted for use in a given motor armature with a minimum of change in the standard manufacturing steps required for fabrication of such armature. Other objects and advantages of the invention will appear in the following description and the drawings wherein:

Fig. 1 is a side elevation of an armature embodying the present invention, certain conventional elements of which are shown merely in generalized or outline form; and Fig. 2 is a schematic detail showing the relation of certain elements of the commutator, coil lead and core which are particularly concerned in this invention.

In Fig. 1 of the drawings there is shown a salient pole armature incorporating the present invention, wherein the stack of laminations L forming the armature core with end pieces N of insulating sheet material shaped similarly to the individual core laminations or punchings and commutator C carried on shaft S, the coil windings W shown in outline form only as a group, and the elongated slot wedges G forming closures for the mouths or radial openings of the longitudinal coil slots M between poles P, may all be comprised of any of the known structures of conventional armatures and fabricated by conventional methods, except as otherwise hereinafter described. An insulating element E which may also be of fiber material cut in disk form is disposed between the commutator and adjacent end of the armature winding and is cupped about or reflected across the winding. In contrast with the usual practice in armatures of the general type shown, where the lead receiving slot extends into the segment in a direction parallel to the shaft and therefore perpendicular to the core and direction of rotation, each bar or segment 10 of commutator C is provided at its inner end with a slot running in a direction oblique to the core and direction of rotation, and therefore out of parallelism with the shaft, in which slot is secured the end of a lead 12 running to a corresponding point of the armature winding, as by a body of solder 13 filling the slot about the lead end. The direction of armature rotation, for which this is the preferred lead and slot disposition, is indicated by the curved heavy arrow, the direction of the slot opening, that is, the direction of the slot as viewed from behind and toward the open end, being turned out of parallelism with the shaft through a certain angle toward the direction of armature rotation.

In Fig. 2 the disposition of a lead 12 relative to a corresponding commutator bar 10 and its slot 11 are shown schematically and in enlarged detail, the solder body 13 being omitted from the slot for clarity. The dashed line A represents the center line of the slot 11, the dashed line B the direction of the armature shaft S and also the centerline of the bar 10 parallel thereto, and the angle between the centerlines, say as projected on a plane tangent to the center of the arcuate brush contact surface of bar 10, is designated by α, preferably about 30°. More precisely, the dashed line B represents the edgewise projection of an axial plane dividing the commutator bar or segment longitudinally. The heavy curved arrow, as in Fig. 1, indicates the direction of armature rotation for which the depicted direction of slot and lead obliquity is preferred.

The lead 12 has a straight portion 12a as appears from coincidence of its centerline with line A in Fig. 2, running parallel to the slot direction endwise (i. e., rather than radially through the commutator contact surface) out of the slot toward the direction of rotation, and merging, through a smoothly curved portion 12c, in a portion 12b which runs back in reversed direction to pass to the corresponding point of the winding.

In the typical armature of fractional horsepower commutating motors the terminal portions of coils having a common point to be connected to the commutator are brought out of the main mass of the winding as paired wires forming the lead to each commutator bar, but for simplicity and clarity of the drawings these are represented as a single heavier conductor. The latter, originating at a common point of such coils, could of course, be used as an electrical equivalent, although an undesirable procedure from the viewpoint of modern mass production practices used for manufacture of the vast majority of commutator motors. However the pair of wires constituting the actual lead are usually bent back upon themselves and twisted together over that portion represented by 12a, 12c and part of 12b, the solder preferably coating the wires up beyond the curve 12c. The precise location of the end of 12b, that is where it enters the mass of the armature winding is not critical, the primary considerations being the skewed disposition of the slot with the portion 12a carried straight out endwise of the slot along the slot centerline or more exactly center plane and the curved rather than sharply or angularly bent shape in length 12c to carry the lead back toward the coil. Although the skew direction shown is preferred for the given direction of rotation, even were the slot and lead dispositions reversed, a marked improvement in lead life is still obtained. For clarity of representation the string band usually wound over the leads is omitted in the drawings.

I claim:

1. In an electric motor armature having a shaft, a core structure carried on the shaft, a commutator assembly carried on the shaft and spaced from the core, and a winding associated with the core having a lead to each segment of the commutator, a commutator structure and connections therefor comprising: a plurality of commutator segments and leads thereto, each commutator segment having a lead receiving slot directed skew relative to the shaft axis direction and opening in the direction of armature rotation, a lead from a corresponding part of the winding to the segment with end secured in said slot, said lead including a straight portion aligned with the slot direction with the free end thereof secured in the slot and the remainder projecting endwise from the slot, a second portion diverging in a direction opposite to armature rotation from the straight portion to the winding, and a curved portion merging into and joining the staid straight and second portions.

2. In an electric motor armature having a shaft, a core structure carried on the shaft, a commutator assembly carried on the shaft and spaced from the core, and a winding associated with the core having a lead to each segment of the commutator, a commutator structure and connections therefor comprising: a plurality of commutator segments and leads thereto, each commutator segment having a lead receiving slot directed skew relative to the shaft axis direction at an angle of about thirty degrees to an axial plane through the segment and opening toward the direction of armature rotation and having a lead from a corresponding part of the winding to the segment with end secured in said slot, said lead including a straight portion aligned with the slot direction with the free end thereof secured in the slot and the remainder projecting endwise therefrom, a second portion diverging back from the straight portion to the windings, and a curved portion merging into and joining the said straight and second portions.

3. In an electric motor armature having a shaft, a core structure carried on the shaft, a commutator assembly carried on the shaft and spaced from the core, and a winding associated with the core having a respective lead to each segment of the commutator, a commutator structure and connections therefor comprising: a plurality of commutator segments and leads thereto, each commutator segment having a lead receiving slot cut in the end thereof adjacent the core, said slot occupying a plane rotated about an included line extending radially through the segment to a position whereby the slot is oblique to an axial plane through the segment and oblique to a radial plane of the armature, a lead from a corresponding part of the winding to the segment with end secured in said slot, said lead including a straight portion aligned with the slot direction with the free end thereof secured in the slot and the remainder projecting endwise from the slot, a second portion diverging backward to the winding from the direction of the straight portion considered relative to a radial plane of the armature, and a curved portion merging into and joining the said straight and second portions.

References Cited in the file of this patent

UNITED STATES PATENTS 516,853     Turner _____ Mar. 20, 1894